(12) United States Patent
Musgrave

(10) Patent No.: US 6,423,800 B1
(45) Date of Patent: Jul. 23, 2002

(54) PELLETIZED POLYOLEFIN HAVING ULTRA-HIGH MELT FLOW AND ITS ARTICLES OF MANUFACTURE

(75) Inventor: Michael W. Musgrave, Houston, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 09/320,380

(22) Filed: May 26, 1999

(51) Int. Cl.$^7$ .................. C08F 4/28; C08F 210/00
(52) U.S. Cl. ............... 526/227; 526/348; 525/240; 525/242; 525/387
(58) Field of Search ................ 526/348, 227; 525/240, 242, 387

(56) References Cited

U.S. PATENT DOCUMENTS

| | | | |
|---|---|---|---|
| 4,451,589 A | * | 5/1984 | Morman et al. ............ 523/124 |
| 4,665,118 A | | 5/1987 | Bourland |
| 4,971,937 A | | 11/1990 | Albizzati et al. |
| 4,978,648 A | | 12/1990 | Barbe et al. |
| 5,427,845 A | | 6/1995 | Sawyer et al. |
| 5,443,898 A | | 8/1995 | Gessner et al. ............. 428/286 |
| 5,464,688 A | | 11/1995 | Timmons et al. ........... 428/298 |
| 5,476,911 A | | 12/1995 | Morini et al. |
| 5,529,850 A | * | 6/1996 | Morini et al. ................ 428/500 |

FOREIGN PATENT DOCUMENTS

| | | |
|---|---|---|
| DE | 27 20 701 | 11/1978 |
| EP | 0 320 150 A2 | 6/1985 |
| EP | 0 361 494 A2 | 4/1990 |
| EP | 0 362 705 A2 | 4/1990 |
| EP | 0 471 463 A2 | 2/1992 |
| EP | 0 480 190 A2 | 4/1992 |
| GB | 2100268 | 12/1982 |

* cited by examiner

Primary Examiner—David W. Wu
Assistant Examiner—Ling-Siu Choi
(74) Attorney, Agent, or Firm—Rodney Carroll

(57) ABSTRACT

Provided is pelletized polymer composition, a majority of which is poly-α-olefin or poly-α-olefin copolymer, which when melted displays melt flow rate greater than about 500 dg/min.

22 Claims, No Drawings

PELLETIZED POLYOLEFIN HAVING ULTRA-HIGH MELT FLOW AND ITS ARTICLES OF MANUFACTURE

FIELD OF THE INVENTION

This invention relates to provision and use of polyolefin, notably poly-α-olefin, particularly polypropylene, having remarkably high melt flow rates, provided in pellet form, and articles made from such material.

BACKGROUND OF THE INVENTION

It is known that poly-α-olefins, particularly polypropylene, may have its weight average molecular weight decreased substantially, or its melt flow rate substantially increased, by controlled degradation of the polymer. This may be accomplished by any of several means including reaction of the polymer with free radicals or free radical-producing agents, heat treatment, subjection of the polymer to high shear, or high strain in a manner to generate heat, trigger peroxide reaction with the base polyolefin, other means, or combinations of these. The effect attained is that polymer molecule scission occurs resulting in an overall lowered molecular weight or elevated MFR. Addition and reaction of peroxide with polymer is well known in the industry and is known generally as vis-breaking or peroxide degradation.

U.S. Pat. No. 4,665,118 issued to Bourland May 12 1987 describes a vinyl molding compound having high melt flow rate propylene-based polymer and calcium stearate incorporated which exhibits reduced processing energy upon molding.

U.S. Pat. No. 4,971,937 issued to Albizzati et al. Nov. 20, 1990 describes solid catalyst components for the polymerization of olefins and modified with electron-donor compounds, comprising a titanium halide supported on a magnesium dihalide in active form and containing as an electron-donor compound.

U.S. Pat. No. 4,978,648 issued to Barbe et al. Dec. 18, 1990 describes catalysts for polymerization of olefins.

U.S. Pat. No. 5,427,845 issued to Sawyer et al. Jun. 27, 1995 describes Melt-spun filaments having a highly crimped configuration which is imparted by differential cooling, non-woven webs of the crimped melt-spun filaments, and a process of forming a nonwoven web of the crimped filaments. Such filaments are formed from a random copolymer of propylene and ethylene or an α-olefin of at least four carbon atoms which provides an enhanced response to crimping by differential cooling.

U.S. Pat. No. 5,476,911 and 5,529,850 issued to Morini et al. describe crystalline propylene polymers having MWD less than or equal to about 3.7 and with MFR in the range of 600 to 1,000 dg/min and Mw in the range of 100,000 to 60,000, and Mz greater than or equal to 140,000 which are obtained by way of polymerization with stereospecific supported catalysts. The resulting polymer is then subjected to degradation by free radical generators, particularly organic peroxides. Fibers produced from such propylene polymers are also described.

EP 0 362 705 A2 describes catalysts, for the polymerization of α-olefins, being the reaction product of an aluminum alkyl, an ether containing at least two ether groups which can form complexes with anhydrous Mg $Cl_2$ and a solid catalyst component comprising anhydrous magnesium dichloride in active with a supported titanium compound of particular electronic configuration and an electron-donor compound.

EP 0 361 494 A2 describes components and catalysts for the polymerization of olefins being solid and modified with electron-donor compounds, comprising titanium halide supported on magnesium dihalide in active form and containing as an electron-donor compound a di- or polyether having specific reactivity characteristics toward $MgCl_2$ and $TiCl_4$.

EP 0 480 190 A2 describes propylene and other α-olefin polymers having specified crystallinity and isotacticity with apparently low xylene solubilities and molecular weights between 5,000 and 100,000.

EP 0 320 150 A2 describes an ultra-high molecular melt flow rate propylene polymer in which the molecular weight distribution in not inversely proportional to the melt flow rate which is produced without post-reactor treatment by contacting propylene and hydrogen in the gas phase in the presence of a high activity catalyst.

DE 27 20 701 describes polyolefins of differing tacticity, crystallinity with and without substituents for pendant hydrogens. Some are copolymers, with some of these being block copolymers.

Morman et al., issued May 29, 1984, describes thermoplastic polymers with improved processability resulting from initial partial degradation of high molecular weight polymers using a chemical prodegradant present in excess of the amount of the amount reacted during pelletization. Polypropylene having high molecular weight, in the range of from about 250,000 to 1,000,000, is noted as being the typical range for commercially produced polypropylene; it is further noted that polypropylene with weight average molecular weight less than about 130,000 cannot be easily pelletized and that, therefore, polymer producers will prefer delivering polypropylene having weight average molecular weight greater than about 160,000.

I have found that use of lower initial molecular weight polymer, or higher melt flow rate polymer, will generate less frictional heat in compounding into pellets. This means that viscous dissipation of the heat will cause less peroxide activation and allow pelletizing at generally lower temperatures or at longer exposure periods. Using lower weight average molecular weight (Mw), or higher melt flow rate, starting material requires less of the vis-breaking agent, such as peroxide, to reach the desired very high or ultra-high melt flow rates. Therefore, the material will be less prone to difficulties with unreacted, or non-degraded, high molecular weight polymer in the form of gels. Such gels, upon formation of non-woven fabric lead to a type of defect called "shot" in the fabric, or a pass-through plug of hard material. Further benefit may be found in the formation of less of the undesirable by-products of peroxide degradation.

Practice of my invention allows use of polyolefins, particularly polypropylene, having a starting weight average molecular weight in the range of up to about 120,000, compounding with a chemical degradant, pelletizing, and delivery of pelletized polymer having a final effective melt flow rate of greater than about 600 dg/minute.

SUMMARY OF THE INVENTION

Our invention provides, at least, polyolefin, notably poly-α-olefin polymer, particularly polypropylene, having ultra or extremely high melt flow rates. Such flow rates will be in the range of at least about 600 g/10 minutes through at least about 2,000 g/10 minutes. Such polymer may be homopolymer or copolymer and is produced in and supplied as pelletized polymer rather than as the granular reactor-grade product which is typically provided in applications in which high melt flow rate polymers are desired. Products formed from this high melt flow rate, or low molecular weight material constitute part of this invention.

DETAILED DESCRIPTION

My invention provides pelletized polymer composition, a majority of which is polyolefin having been made as polymer having weight average molecular weight less than or equal to about 120,000 but which, when melted, displays melt flow rate greater than about 500 dg/min using ASTM 1238, condition L.

Another embodiment provides pelletized polymer composition, a majority of which is poly-α-olefin or poly-α-olefin/olefin copolymer having been made as polymer having weight average molecular weight less than or equal to about 120,000 but which, when melted, displays a melt flow rate greater than about 500 dg/min.

A further embodiment provides pelletized polymer composition, a majority of which is polypropylene or propylene co-polymer having been made as polymer having weight average molecular weight less than or equal to about 120,000, yet which when melted displays a melt flow rate greater than about 500 dg/min.

In overview, this invention provides several embodiments of at least, pelletized polyolefin polymer, notably poly-α-olefin polymer, particularly polypropylene, having been made as reactor-grade polymer of weight average molecular weight equal to or less than about 120,000, yet displaying ultra- or extremely high melt flow rates upon re-extrusion. Such polymer includes copolymers, such as for example ethylene copolymers, notably ethylene/propylene copolymers, and is produced in and supplied as pelletized polymer rather than as the granular direct-from-the-reactor product which is typically provided for and used in applications in which very high melt flow rate polymers are desired. Very high melt flow or ultra-high melt flow in this discussion intends flow rates greater than about 500 dg/min. with ultra-high melt flow being particularly applicable to flow rates greater than about 1,000 dg/min.

Advantageously, this pelletized product is exemplified by propylene homopolymer having greater bulk density (about 0.525 g/cm$^3$) than reactor-grade "fluff", or fine granular resin (about 0.45–0.50 g/cm$^3$). It is, therefore, easier to use and, in light of its pellet form and higher bulk density, is much more safely and simply handled than are the granular products which are not as consistent and which do not provide the free-flowing characteristics of the raw material as the polymer product of this invention. Generally the reactor grade materials, those not pelletized, have the consistency of laundry detergent powder or sugar or are spherical with a very broad size distribution.

Clearly it has either been very difficult for others in the polymer-supply industry to produce such product or the concept of a product with such a combination of extraordinarily high melt flow and pelletized form has not been formed elsewhere for those polymers having weight average molecular weight less than or equal to about 120,000. Indeed, a product of this nature may present challenges to the average polymer resin supplier in that its extrusion and pelletization is difficult in light of the material's low melt viscosity and melt elasticity.

A second embodiment provides extremely high melt flow rate polyolefin, notably poly-α-olefin, particularly polypropylene, and combinations or copolymer with remarkably low solvent solubility. This low solubility, generally in the range of less than about 5% and generally expected to be less than about 4.5%, is particularly desirable for polymers for use in making films or containers in, or on, which food produces will be wrapped, enclosed, or placed. Solvent solubilities are often the threshold test for such materials; such tests may be with toluene, xylene, n-hexane, or other appropriate solvent. This invention will provide such solubilities which are less than about five per cent. A particularly useful polyolefin is polypropylene.

These embodiments provide pelletized polymer composition, a majority of which is polyolefin having been made as polymer having weight average molecular weight less than or equal to about 120,000 but which, when melted, displays melt flow rate greater than about 500 dg/min.

Another useful embodiment provides pelletized polymer composition, a majority of which is poly-α-olefin or poly-α-olefin/olefin copolymer having been made as polymer having weight average molecular weight less than or equal to about 120,000 but which, when melted, displays a melt flow rate greater than about 500 dg/min.

An especially beneficial embodiment provides pelletized polymer composition, a majority of which is polypropylene or propylene co-polymer, but which when melted displays a melt flow rate greater than about 500 dg/min.

A useful process embodiment by which such pelletized polymer resin may be produced includes the process of producing pelletized polymer composition, a majority of which is poly-α-olefin or poly-α-olefin copolymer having been made as polymer having weight average molecular weight less than or equal to about 120,000, which when melted displays melt flow rate greater than about 500 dg/min., comprising the steps of:

a) selecting a desirable poly-α-olefin having useful properties but whose MFR is desired to be increased;

b) compounding desirable poly-α-olefin in a manner such that upon completing the step immediately prior to final forming of poly-α-olefin into its final desired form, MFR will be increased into desired range;

c) optionally compounding other desired additives concurrently with, before, after, or combinations thereof, step c); and d) forming desirable poly-α-olefin into pellets of desired shape.

The pelletized polymer embodiments may be beneficially employed by production of fiber derived from the polymer compositions, particularly those with MFR's in the progressively preferred lower ends of the ranges of about 550, about 600, about 650, and about 700. The progressively preferred upper ranges will be about 4,000, about 3,000, about 2,500, about 2,000, and about 1500.

Such fibers may be beneficially produced in meltblown, spunbonded, drawn, or solvent-spun processes or combinations thereof and may be employed manufacture of in garments, filters, and other articles.

Such pelletized polymers, or some of the products produced from them, may also be usefully employed to make sheets, films, or coatings produced by casting, drawing, thermoforming, extruding, blowing, spraying, solvent spraying, flame-spray, combinations of these, or other useful means.

Clearly advantageously, this product in its pelletized form provides convenient handling. Uniform pellets are simply easier to handle and convey than is fine powder which has a significant fines fraction. Powdery granules may also break easily during transit and form even more fines. Fines, whether included in a powder material or generated by comminution of particles after manufacture cause problems, especially with dust, wherever they are transferred or moved. This particularly the case in pneumatic transfer lines and in facilities where people need to work and breathe safely.

Consistency of melt flow of the raw material which is delivered to the forming or conversion machinery is another clear advantage. Such an additional advantage is delivered by providing a pellet with homogeneously, or uniformly, mixed polymer degradant, prodegradant, or agent to cause polymer molecular scission. This is in notable contrast to the reactor grade materials, generally fine powders or irregularly sized beads, onto which additives including degradants or vis-breakers are applied after formation.

These beneficial characteristics, combined with remarkably high melt flow rate and low solvent solubilities, or low concentrations of low molecular weight polymerized monomer or oligomeric forms of monomer provide the final user of the pelletized polymer material or resin value. Use of this pelletized material allows the former, or maker, of final-use polymer products to increase its material transfer rate in light of the fact that the convenient and compact pellets provide a higher bulk density and are flowable in more predictable and consistent ways.

Also provided are products produced from forming this extremely high MFR polymer. Of notable interest are fibers, particularly those which are drawn, melt spun, meltblown, spunbonded, or combinations thereof. High speed formation or production is an area in which the ultra-high melt flow pelletized products can be desirably applied. The extremely rapid production of meltblown fibers, particularly those of very fine denier or fine cross-section, and concurrent formation of their nonwoven fabrics is particularly suited to use of such very or ultra-high MFR polymer in pelletized form, particularly since the material can be so easily and safely delivered or conveyed to the meltblown fabric processing machinery. Such processes and equipment will benefit from the materials' high bulk density and ease and consistency of delivery and handling. Applications which will notably benefit from the extremely rapid process of meltblowing of nonwoven fabric include absorbent fabric for both sanitary and oil sorbency applications, fluid and gas filters, barrier fabrics especially in composites with spunbonded fabrics, fabric wipes, heat, sound, and other insulation and battery separators among other uses.

Films of the ultra-high MFR product are also included, especially those which are cast, drawn, blown, sprayed, solvent sprayed, flame-sprayed, otherwise coated, or combinations thereof. Other inventive applications include those for which the characteristics of the formed products of this ultra-high MFR material are desired; this will include those in which the low melt viscosity is desired and ease of flow of pellet-formed resin prior to entering the forming machinery in production is useful.

Useful and unique flow rates will be in the at least about 250 g/10 minutes through at least about 4,000 g/10 minutes. Products formed from this high melt flow rate, or low molecular weight material constitute part of this invention. Progressively preferred lower limits for the range of melt flow rates will be about 250, about 400, about 600, about 650, and about 700 g/10 minutes. Progressively preferred upper limits for melt flow rates will be about 4,000, about 3,000, about 2,000, about 1,500, and about 1,200 g/10 minutes. Use of such high flow rate polymer provides numerous advantages for the operation of polymer forming equipment in converting the polymer into its final useful form. Use for such ultra-high MFR materials allows operation of the forming equipment at generally much lower temperatures, lower pressures, and lower shear rates while producing generally less smoking, creating less low molecular weight material thereby providing lowered solvent solubilities, as well as allowing generally lowered processing costs, and creating the possibility of less machine wear than would normally be seen with lower MFR, or higher molecular weight, materials which are commonly used in the industry.

Other benefits of lower temperature production processes include less thermal degradation of the polymer which, in turn, will mean less buildup of degraded polymer, or more fully degraded carbonized polymer on forming dies, such as on the melt-blown dies. This will mean longer times between die cleanings; yielding longer running periods, less down time and generally higher productivity.

Generally, an effectively high MFR, of greater than about 500 dg/min, but generally in the range of about 1200, polyolefin may be created by coating granular reactor-produced or reactor-grade polymer with a peroxide and an antioxidant, such as a hindered phenol, for heat or radiation stabilization or other neutralizing agents or processing aids including Group 2 metal soaps including calcium stearate. Such coated granular material will, when exposed to heat, high shear, or high strain in a manner to generate heat, trigger peroxide decomposition and subsequent reaction with the base polyolefin thus causing polymer molecule scission resulting in an overall lowered molecular weight or elevated MFR. Addition and reaction of peroxide with polymer is well known in the industry and is known generally as vis-breaking, controlled rheology (CR), or peroxide degradation. For background purposes, some of these techniques, of causing polymer degradation by application of heat, oxygen, peroxide, or other processes with similar results, are described in U.S. Pat. No. 3,563,972; 3,608,001; 3,862,265; and 3,898,209.

While use of the vis-breaking process is useful to the final former of the polymer, it creates a need for an extra process step and adds expense to the process in equipment and process requirements. Provision of vis-breaking or controlled rheology (CR) process initiators prior to or during pelletization, if it has even been considered, has previously been difficult to attain in that typical pelletizing equipment operates at shear rates or temperatures sufficient to trigger the molecular degradation desire d as the last process step prior to final polymer formation into its desired product. material thus treated would result in a low-viscosity, sticky mass rather than discreet easily handled pellets. This is caused by polymer degradation through vis-breaking which increases MFR and decreases melt elasticity; this would cause smearing of the extrudate rather than cutting into discreet pellets if pelletization were to be attempted. My invention, however, provides such desirable, easily handled pellets which will create polyolefin polymer, particularly polypropylene, which even though it is pelletized behaves with the expected characteristics of the desired extremely high MFR.

EXAMPLES

A sample of polypropylene reactor-grade fluff or granule having about 300–330 dg/min. MFR exhibiting xylene solubles of about 2–6% was obtained from Fina Oil & Chemical Company, Deer Park, Tex. USA as their commercial grade, FINA® 3960. This material was then compounded with 0.06% Lupersol 101 available from Atochem, 0.05% Irganox 1076 available from Ciba-Geigy, and 0.025% calcium stearate. Generally, to obtain a polymer with MFR in the range of 1,200–1,500 dg/min, about 1,800–2,000 ppm of peroxide will be used in the polymer resin. Additives inclusion was accomplished in a continuous blender in to which dried reactor fluff product is moved and mixed while additives are mixed with the granular resin.

After the previous dry-blending of additives the well-mixed fluff plus additive material was then further compounded and pelletized under time and conditions under which peroxide, particularly Lupersol 101, available from Atochem, also preferably Trigonox 301, available from Akzo Nobel would not react to decompose the polymer significantly. By keeping residence times of short duration and temperatures low to prevent significant molecular scission or degradation, the polymer was able to be neatly and cleanly pelletized. Thus, a useful, easily handled, and convenient pelletized product is created.

The pellets described and used in the following examples were produced by extrusion of the reactor-grade fluff or powder into which was mixed the additive prodegradant, in this case peroxide, through a Prodex single-screw extruder having six heat zones and pelletized by a Baker-Perkins hot-face pelletizer. The extruder had a screw length of about 7.2 m (284 in.) with about 5.9 m (231.5 in.) of that containing screw flights, an outside diameter of about 20.25 cm (7.974 in.), an L/D ratio of 29, being run with a screw speed of about 143 rpm. The average throughput of pellets was approximately 2250 kg/hr (4940 lb/hr) with an approximate average residence time of in the range of about 90 seconds.

Temperature measurements were made at several points throughout the extruder, their averages are reported below:

| Zone 1 | 234° C. (454° F.) | Slide Plate | 234° C. (454° F.) |
| Zone 2 | 193° C. (379° F.) | Upstream | 231° C. (448° F.) |
| Zone 3 | 197° C. (387° F.) | Rear Seal | 87° C. (189° F.) |
| Zone 4 | 207° C. (404° F.) | Barrel vent | 118° C. (245° F.) |
| Zone 5 | 197° C. (387° F.) | Adapter | 197° C. (387° F.) |
| Zone 6 | 224° C. (435° F.) | Die | 225° C. (437° F.) |

In an effort to illustrate the invention described here and later claimed, I have provided several examples. These examples are intended only to assist in providing a clear understanding of my invention; they are not provided to limit the invention or narrow the scope of what is rightfully claimed as the invention. Upon viewing the examples and understanding the sense of this invention, those skilled in this area of the art will likely perceive other examples and uses which may not be specifically mentioned here; such is not to be considered excluded from my invention.

Examples 1 (A, B, C) and 2 (comparative)

The first two examples were prepared by obtaining two relatively similar homopolypropylene (hPP) lots from Fina Oil & Chemical Company's polypropylene plant in Deer Park, Tex. USA; one of which was used as a comparative control (Example 2) and one of which (Example 1) was treated with a peroxide. The peroxide treated polymer was subjected to GPC testing as granules (Ex. 1 A), pelletized and then subjected to GPC testing as pellets (Ex. 1 B), and finally the pellets used for Ex. 1 B were tested, according to ASTM D 1238L, for melt flow rate (MFR), the extrudate of which was subjected to GPC testing (Ex. 1C). Starting material information follows in Table 1 and GPC results are presented in Table 2. It should be understod that each polymer example presented hereafter may have been compounded with minor amounts additives such as antioxidants, neutralizers, or other processing aids; presence of these will have minimal effect on the MFR properties of the polymer of interest.

TABLE 1

| | Ex. 1 | Ex. 2 (comparative) |
|---|---|---|
| Polymer | hPP | hPP |
| Fluff MFR (dg/min) | 294–334 | — |
| H/B Melt Flow Test (dg/min) | 808 | 401 |
| Xylene Solubles | 2.9% | 3.0% |
| Hunter b Color (#) | −1.2 | −1.2 |
| Additives | | |
| Calcium Stearate | 0.030% | 0.030% |
| Irganox 1076 | 0.049% | 0.014% |
| Lupersol 101 | 0.065% | 0.000% |

TABLE 2

| GPC Results | Ex. 1A Granular | Ex. 1B Pellets | Ex. 1C MFR Extr. | Ex. 2 Comp. |
|---|---|---|---|---|
| Mn | 12,900 | 13,100 | 13,000 | 12,800 |
| Mw | 81,400 | 72,200 | 54,400 | 83,400 |
| Mz | 268,000 | 211,000 | 128,000 | 306,000 |
| Mz + 1 | 489,000 | 376,000 | 205,000 | 607,000 |
| MW/Mn | 6.31 | 5.49 | 4.18 | 6.54 |
| Mz + 1/Mw | 6.00 | 5.20 | 3.76 | 7.28 |

As may be understood from viewing the previous tables, the MWD (Mw/Mn), and therefore the MFR, of the pelletized and extruded material of Example 1 C has been substantially reduced. This is accomplished by reduction of the weight average molecular weight (Mw) of the polymer by the cleaving action of the peroxide as provided during the heating and melting of the material for the MFR extrusion. Clearly, provision of such a consistent, well-compounded pellet form of the polymer ready to be vis-broken in the melt process is an advantage for the producer of the final polymer articles. Simply put, since the polymer resin composition of my invention is melt-compounded and therefore more intimately blended, as opposed to simply having the peroxide sprayed on after production of the polymer, the pelletized material will be more consistent in its characteristics, especially in its high melt flow rate.

The process described allows production of a pelletized product which will have an apparent or actual "in use" MFR significantly higher than is normally attainable with conventional processing and currently marketed polymer pellets. However, the pellets themselves will act like a much lower MFR material until the vis-breaking reaction is triggered in the polymer-formers' plant. Thus shipping and handling will be convenient, easy, and safe but the behavior of the product will be similar to one of a much higher MFR.

Use of the pelletized polymer of this invention provides means for final product producers to make consistent products of smaller dimensions and at higher production rates than would have been previously available.

Example 3

Extremely fine, or micro-denier, fibers may be produced by any of the available processes but will be particularly easy to produce at high rates in meltblown and spunbonded processes. The extremely high flow rates of the melted polymer pellet s of this invention allow very fast blowing and spunbonding fiber formation with fibers drawn to very small cross-sectional areas.

Example 4

Fibers produced in Example 3 will provide the basis of very well made fabrics, particularly nonwoven fabrics. These may be non-wovens of simply either meltblown fibers or spunbonded fibers or they may be composite non-woven fabrics including those which are layered of spunbonded/meltblown/spunbonded (SMS) layers. Such fabrics may be made on a scale to provide filtration of solids and liquids from gas streams with the small cross-sectional area capabilities of production with this pelletized polymer.

Example 5

Fabrics of Example 4 will find use in numerous applications. These will include absorbent garments for personal hygiene such as diapers, continence garments, sanitary napkins, and other hygiene and feminine hygiene applications. Other uses of the sorbency characteristics of these products will include use in clean ups of oil and other hazardous spills.

Example 6

Fabrics of Example 4 will also find use in other hygienic applications including medical, surgical, dental, veterinary, and chiropractic fields and applications. Such uses will include sheets for defining and draping of surgical arenas, single use or disposable, or multiple use garments such as surgical gowns, head covers, face covers or masks, foot covers or booties, patient gowns, patient bibs, other dental drapes, and gauntlets or other arm covers.

Example 7

Such fabrics will also find use in single use equipment covers such as headrest covers, exam table sheets, and adjustment table sheets as well as in containment devices including laundry bags.

Example 8

Fabrics produced by filaments made from the pelletized product of my invention will be fine with extremely fine pass-throughs between and among filaments. These characteristics means that such fabrics will yield excellent yet inexpensively produced filters.

Example 9

With the fine filtering capacity of such fabrics, they will be useful for personal protective gear including dustmasks, surgical masks. Such devices will be capable of retaining solids and liquids on the outer layers while allowing "breathing", both literal and figurative, of the user and the enclosed portions of the wearers' bodies.

Other Vis-Breakers

Another peroxide, useful for molecular scission of polymers, as a polymer degrader, or vis-breaker has recently become available in Trigonox 301 made by Akzo Nobel. This is 3,6,9-triethyl-3,6,9-trimethyl-1,4,7-triperoxane which material is a useful peroxide with a higher temperature generation of the free radical. The active prodegradant, or controlled rheology (CR) agent is supplied as a 40% solution of the active agent in ISOPAR (an inert carrier). The Trigonox 301 provides benefits of a higher half-life temperature, higher theoretical oxygen content of the active peroxide, and decomposition products with fewer objectionable characteristics.

Trigonox 301 would be incorporated into the higher molecular weight polymer in similar ranges of concentration as the other degraders. In light of its higher activation temperature it will tend to activate less during pelletization and therefore make pelletization easier. Its higher active oxygen contribution will also allow lower levels of loading of active prodegradant agent for equivalent molecular scission activity. These are exemplified with half-life exposure times and temperatures:

Trigonox 301: 0.1 hr @ 170° F.; 1 hr @ 146° F.; and 10 hr @ 125° F.; as compared with:

Lupersol 101: 0.1 hr @ 156° F.; 1 hr @ 134; and 10 hr @ 115° F.;

Active oxygen: Trigonox 301=7.5% (40% solution of 18.16% active agent; Lupersol 101=10.14%.

From a practical standpoint this means that nearly half as much of the active peroxide available in Trigonox 301 would need to be compounded with a polymer to be finally degraded after pelletizing as would be needed for the Lupersol 101 figured simply on the basis of active oxygen concentration. When it is further considered that less of the Trigonox 301 polymer molecular scission initiator would be degraded during the compounding and pelletizing; it is likely that a bit less could be used as it would remained unactivated until the pelletized polymer experienced its final compounding just prior to formation into its final article.

Examples 10 A–B, 10 C–D, and E

A sample of homopolypropylene with an initial MFR of 214, FINA® 3900 series reactor grade fluff, was used to create four samples for vis-breaking or peroxide degradation and testing. These polymer resin pellets were pelletized with a laboratory-sized Welex extruder with an approximately 5 cm. (2") barrel. Zones 1–3 were set at 400° F., Zone 4 was at 390° F., the screen changer was set at 425° F., the first and second breaker plates were at 450° F. and the die was at 510° F.; screw speed was 150 rpm. Information on these pelletized samples with their comparative data (from 3900 fluff) is presented in Table 3. The tradename Trigonox is abbreviated simply as "T". Concentration of the prodegradant, identified as "(ppm)", is listed as amount compounded into the polymer resin based on polymer weight. Various molecular weights and ratios were determined by size exclusion chromatography or gel permeation chromatography (GPC), a technique commonly used in the art and providing quantification of molecular size ranges available in particular polymer resins, and are listed as Pellet GPC. Similar measurements were taken on polymer extruded while conducting an MFR test, these are identified as "MFR Extrudate".

TABLE 3

| Example 10 | A | B | C | D | E |
|---|---|---|---|---|---|
| Peroxide (ppm) | T-101 (740) | T-101 (2590) | T-301 (880) | T-301 (2590) | — |
| Pellet MFR (dg/min.) | 807 | 1713 | 783 | 1905 | 214 |
| Gels (#/3 min.) | 5 | 3 | 2 | 1 | — |
| Pellet GPC | | | | | |
| Mn | 16850 | 16242 | 17015 | 16839 | 18521 |
| Mw | 83955 | 77165 | 95021 | 89440 | 105504 |
| Mz | 261717 | 235608 | 338915 | 300622 | 358208 |
| Mw/Mn | 5.0 | 4.8 | 5.6 | 5.3 | 5.7 |
| MFR Extrudate | | | | | |
| Mn | 13196 | 12172 | 13713 | 12425 | — |
| Mw | 55786 | 39322 | 57821 | 43618 | — |
| Mz | 146606 | 82588 | 150027 | 101207 | — |

TABLE 3-continued

| Example 10 | A | B | C | D | E |
|---|---|---|---|---|---|
| Mw/Mn | 4.2 | 3.2 | 4.2 | 3.5 | — |
| Hunter b Color (#) | −0.3 | 0.4 | −0.4 | −0.1 | — |

As may be seen from these results the all of the molecular weight measurements (Mn, Mw, and Mz) for both the compounded pellets and melt flow extrudate, as measured by GPC, remained higher for the two examples using Trigonox 301 (C and D) than for those using Trigonox 101 (A and B). Also, it is clear that there was a greater drop in these values from the compounded pellets to the MFR extrudate for each sample in those using Trigonox 101 than those using trigonox 301. This indicates that the Trigonox 301 causes less polymer degradation at the pelletizing compounder than the 101 and therefore the greatest molecular scission occurs during the later heat, confirming that the 301 v. 101 activation temperature and half-life at temperature are both higher for Trigonox 301. The MWD also confirms these observations.

Example 11, A, B, and C

Polypropylene reactor grade fluff used in the production of FINA® EOD-97-18, a developmental grade (Example 11C), was compounded with Trigonox 101 and Irganox 1076 and calcium stearate, pelletized, and compared with Examples 10B and 10D (now identified as 11A and 11B respectively). These samples were also tested by making melt-blown fabric on two different melt-blown lines. GPC was run on the pellets (Pellet GPC) and on the meltblown fabric for the first extruder line (MB-1). Fabric evaluation results are presented as MB-1 Fabric and MB-2 Fabric. The results are presented in Table 4.

TABLE 4

| Example 11 | A | B | C |
|---|---|---|---|
| Pellet GPC | | | |
| Mn | 16242 | 16838 | 13405 |
| Mw | 77165 | 89440 | 54352 |
| Mz | 235608 | 300622 | 136236 |
| Mw/Mn | 4.8 | 5.3 | 4.1 |
| MB-1 GPC | | | |
| Mn | 10267 | 10554 | 10593 |
| Mw | 35408 | 38989 | 42868 |
| Mz | 79672 | 89880 | 111645 |
| Mw/Mn | 3.4 | 3.7 | 4.0 |
| MB-1 Fabric | | | |
| Basis Wt. (g/m$^3$) | 18.7 | 18.3 | 18.3 |
| Hydrohead (mm) | 2004 | 2004 | 1388 |
| Air Perm. (scfm) | 53 | 72 | 89 |
| MB-2 Fabric | | | |
| Basis Wt. (g/m$^3$) | 22.4 | 22.2 | 22.2 |
| Hydrohead (mm) | 512 | 420 | 466 |
| Air Perm. (scfm) | 93 | 124 | 116 |

As in the previous tests, the polymer compounded and pelletized with Trigonox 301 maintained the greatest difference in molecular weight measurement among all three indicating that its greatest molecular scission was occurring at or during its final compounding, extrusion, or their combination just prior to fiber formation rather than at pelletization. This is likely a better test of actual polymer degradation as the material was subjected to actual compounding, mixing, and extrusion at fiber blowing rather than simple melting and extrusion at MFR testing; thus the results are more representative of good working conditions and offer the prodegradant an opportunity to be intimately mixed with the polymer to assist in degradation rather than losing a significant of peroxide to simple decomposition.

Useful Variations

The examples presented here were made from homopolypropylene produced by traditional Ziegler-Natta catalyst also known as multi-site or heterogeneous catalyst. Benefit will also be gained by the practice of this invention to polyolefins formed by catalysis with single-site, also known as homogeneous, catalysts of which metallocenes are a well-known group.

Copolymers and their products represent an area in which beneficial results may be obtained by the practice of this invention. By introduction of comonomers into the catalysis of olefin monomers the characteristics of homopolymers may be modified substantially. Copolymerization of ethylene and propylene for example yields a wide range of resins with widely varying densities. The elastomers, for example, form soft pliable fibers and films which would be usefully formed from pelletized very high melt flow resin.

By altering the loading of peroxide contained in the material prior to its final compounding and pelletization, as well as modifying the compounding times and conditions to some degree, the final or apparent MFR of the pelletized material may be tailored from low-moderate MFR in the range of about 250 or 300 through about 600 or 650 on up to melt flow rates in the range of about 2,000, 2,500, 3,000, 4,000 or, if desired, even higher.

Aside from the enhanced ease of handling, this product will provide other processing benefits to the final producer of poly-α-olefin based products. Use of this pelletized, with its intimately blended yet unreacted vis-breaking agent, generally peroxide, product will provide excellent flow characteristics without the need for the producer of the final articles to add peroxide, more uniform processability will result from the use of the consistent pellets rather than the difficult to handle granular material, and will provide material of greater bulk density than the granular fluff or powder material thereby providing greater transportation efficiency. Further, thoroughly compounding the peroxides and other additives provides greater product stability than granules surface-coated with similar combinations of additives. Color concentrate (pellets formed into a "master batch" by compounding polymer resin with pigments or other colorants, as supplied by numerous commercial compounders) additions at the feed hopper of the final article producer will be more uniform than with the irregular-feeding granular material. Further use of such pelletized product will minimize safety concerns over exposure to "dusting" of coated granular product. Finally, it has been seen that use of pelletized material causes less gas (oxygen) incorporation, or air entrainment or entrapment, during extrusion, providing more consistent rheology and process control in processes producing small cross-sectional area products.

Pelletized product which will degrade and reduce its melt viscosity or increase its melt flow just before formation into its final article provides many safety benefits as well. Practice of this invention will mean that workers at the final former's plant will be exposed to less degradant, generally a peroxide, with pellets which have the degradant mixed within themselves as opposed to having to handle dusty, fine particles upon which a peroxide has been sprayed. Pellets resulting from the practice of an embodiment of my invention produce pellets with highly enhanced consistency resulting from compounding; the pellets are uniform in their composition as opposed to dust-like particles having sprayed-on additive.

The pellets of my invention will also provide more uniform final products. Some reactor-grade fluff products, provided in the form of coarse spheres of non-uniform size, which have been sprayed with a peroxide; some of these products are highly variable in the size of the fluff-particles. This means that even if the particles are evenly coated, the peroxide treatment necessarily will be non-uniform in light of the surface-to-volume ratio. A large particle with an even coat will have less peroxide treatment than a small particle with the same even coat. With uniform consistency pellets, such overtreatment and undertreatment will not occur. Similar difficulties with products provided in powder form as peroxide-treated reactor-grade fine powdery product.

Additionally, the handling of pellets is simply easier and much less dusty than the handling of irregularly-sized and shaped particles; the uniform pellets generate much less dust, thereby avoiding a notable safety concern in dusting of the product, than the fine-grained particles, and generally non-uniformly sized particles of other products.

Further, pelletization of these melt-compounded products will provide other benefits from exclusion or minimization of air entrapment in that air included in granular material, when melted for production of final articles, may interact with the vis-breaking reactions causing more or less polymer degradation over time. This means that yet another variable is added to the polymer article former's process which may alter the intended melt viscosity and elasticity characteristics thus altering the characteristics of the final product. While my work has been done mostly with traditionally catalyzed polymer, the practice of this invention will work well with the non-traditionally Ziegler-Natta catalyzed polymers, particularly including those produced by metallocene catalysis and single-site catalysts in general.

Another distinct advantage of producing pelletized product is that master batches may be produced. These may then be split as needed to add varying additive "packages" to the final melt-compounded, extruded, and pelletized product. These may be specialty additive packages including, among others, fluoropolymers to serve as processing aids or lubricants, colorants, anti-static materials, anti-blocking agents, and other additives to enhance final article or processing properties. Since the pelletized product is compounded and highly uniform in its composition, its use provides an opportunity to use additives which otherwise could not be sprayed on a previously spray-treated granular material.

It is to be understood that the previously provided examples are intended for illustrative purposes to aid in understanding the breadth, depth, and extent of this invention. They are not intended to be all-inclusive and are not intended to limit the scope of my invention which is described by the following claims.

I claim:

1. A polymer composition, a majority of which is pelletized polyolefin having weight average molecular weight less than or equal to about 120,000 and comprising an effective amount of unreacted prodegradant blended therewith such that, when melted, the polymer composition displays melt flow rate greater than about 500 dg/min.

2. A polymer composition, a majority of which is pelletized poly-α-olefin or poly-α-olefin/olefin copolymer having weight average molecular weight less than or equal to about 120,000 and comprising an effective amount of unreacted prodegradant blended therewith such that, when melted, the polymer composition displays a melt flow rate greater than about 500 dg/min.

3. A polymer composition, a majority of which is pelletized polypropylene or propylene co-polymer having weight average molecular weight less than or equal to about 120,000 and comprising an effective amount of unreacted prodegradant blended therewith such that when melted the polymer composition displays a melt flow rate greater than about 500 dg/min.

4. Fiber derived from the polymer composition of claim 1 wherein the melt flow rate is in the range of about 600 to about 4,000.

5. Fiber of claim 4 wherein melt flow rate is in the range of about 700 to about 2,500.

6. Fabric comprising fiber of claim 5.

7. Fabric of claim 6 wherein fiber is produced by meltblown, spunbonded processes, or combinations thereof.

8. Garment, filter, or other article comprising fabric of claim 6.

9. Garment, filter, or other article comprising fabric of claim 7.

10. Fiber derived from the polymer composition of claim 2 wherein the melt flow rate is in the range of about 600 to about 4,000 dg/min.

11. Fiber of claim 10 wherein melt flow rate is in the range of about 700 to about 2,500.

12. Fabric comprising fiber of claim 11.

13. Fabric of claim 12 wherein fiber is produced by meltblown, spunbonded processes, or combinations thereof.

14. Garment, filter, or other article comprising fabric of claim 12.

15. Garment filter, or other article comprising fabric of claim 13.

16. Fiber derived from the polymer composition of claim 3 wherein the melt flow rate is in the range of about 600 to about 4,000.

17. Fiber of claim 16 wherein melt flow rate is in the range of about 700 to about 2,500.

18. Fabric comprising fiber of claim 17.

19. Fabric of claim 18 wherein fiber is produced by meltblown, spunbonded processes, or combinations thereof.

20. Garment, filter, or other article comprising fabric of claim 18.

21. Garment, filter, or other article comprising fabric of claim 19.

22. A process of producing a polymer composition, a majority of which is pelletized poly-α-olefin or poly-α-olefin copolymer having weight average molecular weight less than or equal to about 120,000 and comprising an effective amount of unreacted prodegradant blended therewith such that, when melted displays melt flow rate greater than about 500 dg/min., comprising the steps of:

a) selecting a desirable poly-α-olefin having useful properties but whose MFR is desired to be increased;

b) compounding desirable ploy-α-olefin with the prodegradant in a manner such that the effective amount of unreacted prodegradant remains following compounding;

c) optionally compounding other desired additives concurrently with, before, after, or combinations thereof, step b); and d) forming desirable ploy-α-olefin into pellets of desired shape.

* * * * *